United States Patent
Thompson

[15] 3,666,059
[45] May 30, 1972

[54] FAIL-SAFE HYDRUALIC BRAKE APPARATUS

[72] Inventor: Tom H. Thompson, 2800 North Atlantic Drive, Towers Apt. 910, Daytona Beach, Fla. 32018

[22] Filed: Oct. 22, 1970

[21] Appl. No.: 83,083

[52] U.S. Cl. ........................188/106 R, 188/151 R, 188/369
[51] Int. Cl. .........................................................F16d 65/20
[58] Field of Search...................188/106 R, 151 R, 369, 155; 192/88 R; 303/5

[56] References Cited

UNITED STATES PATENTS 3,476,220  11/1969  Kobayashi..........................188/106 R
3,540,560  11/1970  Damico ..............................188/369

Primary Examiner—Evon C. Blunk
Assistant Examiner—Johnny D. Cherry
Attorney—McGlynn, Reising, Milton, Ethington, Adelman, Krass, Perry, Young & Thorpe

[57] ABSTRACT

Hydraulic brake apparatus comprising a housing having a pair of flexible resilient actuators mounted therein each forming a separate closed chamber with the housing. Each of the closed chambers is independently connected with a source of brake fluid. When the brakes are applied to increase the pressure from the source to the actuators, the actuators both expand to apply braking pressure. Since the actuators are independently connected with the source of brake fluid, the failure of one actuator does not result in failure of the system.

19 Claims, 1 Drawing Figure

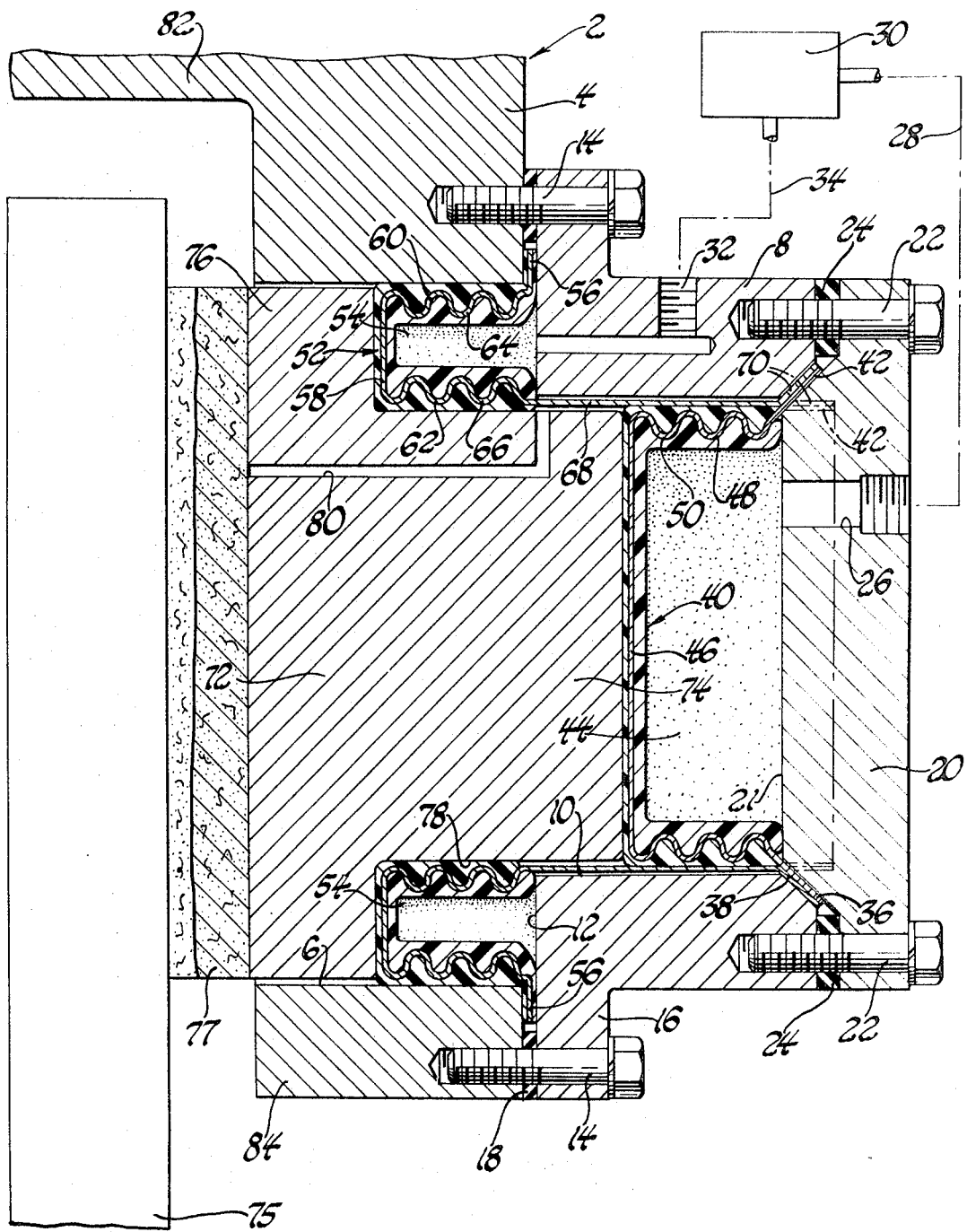

FAIL-SAFE HYDRUALIC BRAKE APPARATUS

This invention relates generally to vehicle brake apparatus, and is particularly concerned with the construction of hydraulic disc brake apparatus having a pair of pressure chambers each connected with a master cylinder or other source of braking pressure so that the failure of the system connected with one of the pressure chambers does not result in failure of the brakes.

U. S. Pat. application Ser. No. 23,699 of Tom H. Thompson, filed Mar. 30, 1970, and entitled "Brake Mechanism" discloses a bellows-type brake actuator for use in a closed hydraulic brake system, the actuator having a corrugated side wall which is inelastically deformable such that when the actuator is extended under pressure, the inelastic deformation of the corrugated side wall prevents the actuator from rebounding to its original length when the hydraulic pressure is removed so that brake lining wear is compensated for by the progressive increase in the relaxed length of the actuator. This type of actuator is particularly suitable for hydraulic disc brake systems for automobiles and other vehicles wherein braking pressure is applied to the surfaces of a disc or rotor mounted to rotate with the wheel of the vehicle. The braking pressure may be applied by the hydraulic actuators mounted in a caliper body secured to a stationary portion of the vehicle and provided with suitable hydraulic connections for transmitting hydraulic pressure to and from the actuators. The caliper housing for the actuators is shaped and located such that a portion of the brake disc or rotor is received between opposed actuators so that braking pressure can be simultaneously applied to opposite side faces of the rotating disc when hydraulic pressure is applied to the actuators.

An object of this invention is to provide hydraulic brake apparatus having a pair of flexible resilient actuators independently connected with a source of brake fluid so that the failure of one actuator, or the system in which it is connected, does not result in failure of the brakes.

A further object is to provide a disc brake caliper construction for a pair of bellows-type actuators, each of which can be operated independently of the other to apply braking pressure when fluid pressure is applied to the actuator from a master cylinder or other source of brake fluid.

The foregoing and other objects are achieved by the provision of a disc brake caliper housing having a main body portion with an opening formed therein and a cap member mounted on the main body portion having an opening coaxial with and of smaller diameter than the opening in the main body portion such that a shoulder is defined by the cap member at the junction of the openings. A cover member is mounted on the outer end of the cap member, and a flexible, resilient bellows-type actuator has a mounting flange clamped between the cover member and the outer end of the cap member. An annular flexible, resilient bellows-type actuator is mounted in the opening of the main body portion and has an outer wall with an end flange clamped between the cap member and main body portion, and an inner wall with an extension formed thereon that projects through the cap member and has a mounting flange also clamped between the cover member and cap member. A stepped piston is mounted in the housing with a reduced portion engaged with the actuator in the cap member and an enlarged portion overlying the movable end of the annular actuator received in the main body portion. Each of the actuators is independently connected with the same or different sources of fluid pressure so that the piston can be caused to apply braking pressure by the expansion of either or both of the bellows-type actuators.

Other objects, advantages and features of the invention will become apparent from the following description taken in connection with the accompanying drawing in which the single FIGURE of the drawing illustrates a sectional view of a disc brake assembly embodying the invention.

With reference to the drawing, reference numeral 2 collectively designates a disc brake caliper housing including a main body portion 4 having an opening or recess 6 formed therein.

A cap member 8 is mounted on the main body portion 4 and is formed with an opening or recess 10 which is coaxial with, and is of smaller diameter than the opening 6 in he main body portion such that a shoulder 12 is defined by the cap member at the juncture of the openings 6 an 10. The cap member 8 is secured to the main body portion 4 by a plurality of bolts 14 extending through openings in a mounting flange 16 into threaded engagement with the main body portion 4. A fluid-tight seal between the cap member and main body portion is provided by a resilient annular gasket 18 clamped between flange 16 an the main body portion 4 by the bolts 14.

A cover member 20 having an inner surface 21 is mounted on the outer end of the cap member 8 by bolts 22 which extend through openings in the cover member into threaded engagement with the outer end of the cap member 8. A fluid-tight seal is provided by a resilient annular gasket 24 clamped between the cover and cap members by bolts 22. A port 26 is formed in the cover member 20 for connection with a hydraulic line 28 from a master cylinder indicated schematically by reference numeral 30.

A hydraulic port 32 is formed in the cap member 8 for connection with a hydraulic line 34 extending from the master cylinder 30 or other source of brake fluid. The outer edge of opening 10 is inclined outwardly as indicated by reference numeral 36, and a complementary inclined surface 38 is provided on the cover member 20.

A first resilient flexible actuator designated generally by reference numeral 40 is received in the opening 10 of cap member 8 and has a peripheral mounting flange 42 clamped between the opposed inclined surfaces 36 and 38 of the cap and cover members, respectively. Actuator 40 cooperates with the cover member 20 to define a closed chamber 44. The actuator 40 has a movable end portion 46 with an outer side wall 48 extending between the end portion 46 and the mounting flange 42. The side wall 48 may be cylindrical, oval, or of other endless configuration in cross-section. The side wall 48 is formed with corrugations 50 such that the side wall is operable to change its length and hence the distance between the movable end portion 46 and the cover member 20 in response to pressure changes in the chamber 44.

A second resilient flexible actuator designated generally by reference numeral 52 is received in the recess or opening 6 of the main body portion 4 and defines a second closed chamber 54 with the shoulder 12. The actuator 52 is annular and has an outer peripheral mounting flange 56 clamped between the cap member 8 and the main body portion 4. The actuator 52 has an annular movable end portion 58 and an outer side wall 60 extending between the movable end portion 58 and the mounting flange 56. The actuator 52 further has an inner side wall 62 that extends between the movable end portion 52 and the shoulder 12. The side walls 60 and 62 of the actuator 52 are formed with corrugations 64 and 66, respectively, so that the side walls are operable to change their length and hence the distance between the movable end portion 58 and shoulder 12 in response to pressure changes in the chamber 54. As is the case with the side wall 48 of actuator 40, the side walls 60 and 62 may be of any endless configuration such as cylindrical, oval, etc.

An extension 68 is formed on the inner side wall 62 of actuator 52 and projects into the opening 10 of the cap member. An inner mounting flange 70 is formed on the end of the extension 68 and is clamped between the cover member 20 and the cap member 8. As indicated in phantom lines in the drawing, the mounting flanges 42 and 70 of the actuators 40 and 52, respectively, can be formed straight and forced to the outwardly extending position shown in full lines by installation of the cover member 20 onto the cap member. The inclined surface 38 engages the outer end of the straight flanges indicated in phantom lines to force the mounting flanges 42 and 70 to their outwardly flared configuration.

A stepped piston 72 responds to expansion and contraction of the chambers 44 and 54 to apply and release braking pressure on a brake disc or rotor 75 through a brake pad 77 mounted on the outer end of the piston. The piston 72 includes a reduced diameter portion 74 which projects into engagement with the movable end portion 46 of actuator 40 with its peripheral side surface 78 engaging the inner side wall 62 of the actuator 52. The piston 72 has an enlarged outer portion 76 which overlies the movable end portion 58 of the actuator 52. A passage 80 is formed in the piston 72 to drain any leakage of brake fluid from the system.

As alluded to above, the actuators 40 and 52 may be of the type disclosed in the copending application Ser. No. 23,699 wherein the corrugations 48, 64 and 66 are inelastically deformable in response to pressure increases in the chambers 44 and 54 causing the actuator side walls to extend in length. The inelastic deformation of the corrugations prevents the respective actuators from elastically rebounding to their original lengths when the pressure is subsequently reduced. Accordingly, wear on the brake pad 77 is compensated for by the progressive increase in the relaxed length of the actuators 40 and 52.

As is also disclosed in the aforementioned copending application, the side walls of each of the actuators may comprise a relatively ductile metal such as beryllium copper with a layer of elastomeric material on either or both surfaces of the metal. The actuators shown in the illustrated drawing have inner and outer layers of elastomeric material, and the elastomeric material of the outer layer is interposed between the radial supporting surfaces for the corrugated side walls provided by the opening 6 and side surface 78 of the piston 72 for the actuator 52, and by the extension 68 for the actuator 40.

The main body portion 4 is in the form of a disc brake U-shaped caliper having a peripheral base portion 82 and a leg portion 84 extending therefrom such that the brake disc 75 extends alongside the leg portion for engagement by the brake pad 77 carried by piston 72 with the base portion overlying the peripheral edge of the rotor 75. Opening 6 is formed in the leg portion 84 as shown in the drawing. The brake shoe 77 is carried by the piston 72 and engages the side surface of the rotor 75 upon expansion of either or both of the chambers 44 and 54.

The master cylinder 30 indicated schematically in the drawing may be of the type having two pressure chambers as disclosed in Scheffler U.S. Pat. No. 3,486,591 such that one braking system is provided by chamber 54, line 34 and the pressure chamber of maser cylinder 30 with which line 34 is connected, and a second braking system is provided by chamber 44, line 28 and the other pressure chamber of the master cylinder 30 with which line 28 is connected. When the master cylinder 30 is actuated by movement of a brake pedal or the like, pressure is applied through both lines 28 and 34 to cause the piston 72 to move toward the left as viewed in the drawing and apply braking pressure to rotor 75. Consequently, failure of either of the systems would not result in failure of the brakes since one of the actuators 40 or 52 will be caused to expand so long as its associated system is working.

Thus, the drawing illustrates hydraulic brake apparatus comprising a housing 2; a first recess 10 defined in the housing having an end wall 21 (of cover member 20) and an endless outer peripheral wall. A second recess 6 is defined in he housing 2 having an end wall 12 and an endless outer peripheral wall surrounding and spaced outwardly from the peripheral wall of the first recess 10. A first flexible resilient actuator 40 is mounted in the housing and forms a first closed chamber 44 with the end wall 21 of the first recess, said first actuator 40 being movable to expand and contract the first chamber 44 in response to pressure changes therein to respectively apply and release the braking pressure. A second flexible resilient actuator 52 is mounted in the housing and forms a second annular closed chamber 54 with the end wall 12 of the second recess 6, the second actuator being movable to expand and contract the second chamber in response to pressure changes therein to respectively apply and release a braking pressure. The end wall 12 of the second recess is annular and the end wall 21 of the first recess is spaced axially from the end wall of the second recess with the outer peripheral wall of the first recess 10 terminating at the inner periphery of the end wall 12 of recess 6.

While a specific example of the invention is illustrated and described in he foregoing specification and accompanying drawing, it should be understood that the invention is not limited to the exact construction shown. Various alternatives in the construction and arrangement of parts, all falling within the scope and spirit of the invention, will be apparent to those skilled in the art.

I claim:

1. Hydraulic brake apparatus comprising: a housing; a first recess defined in said housing having an end wall and an endless outer peripheral wall; a second recess defined in said housing having an end wall and an endless outer peripheral wall surrounding and spaced outwardly from the outer peripheral wall of said first recess; a first flexible resilient actuator mounted in said housing and forming a first closed chamber with the end wall of said first recess, said first actuator being movable to expand and contract said first chamber in response to pressure changes in said first chamber to respectively apply and release a braking pressure; and a second flexible resilient actuator mounted in said housing and forming a second closed chamber with the end wall of said second recess, said second actuator being movable to expand and contract said second chamber in response to pressure changes in said second chamber to respectively apply and release a braking pressure.

2. Apparatus as claimed in claim 1 wherein the end wall of said second recess is annular and the end wall of said first recess is spaced axially from the end wall of said second recess with the outer peripheral wall of said first recess terminating at the inner periphery of the end wall of said second recess.

3. Apparatus as claimed in claim 2 wherein said first actuator includes a fixed end portion secured to said housing; a movable end portion; and an endless side wall extending therebetween having at least one corrugation formed therein, said side wall being operable to change its length and hence the distance between said end portions in response to pressure changes in said first chamber.

4. Apparatus as claimed in claim 3 wherein said second actuator includes inner and outer fixed end portions secured to said housing; a movable end portion; an inner side wall extending between said inner fixed end portion and said movable end portion, and an outer side wall extending between said outer fixed end portion and said movable end portion; and at least one corrugation formed in each of said inner and outer side walls, said inner and outer side walls being operable to change their lengths and hence the distance between the fixed and movable end portions of said second actuator in response to pressure changes in said second chamber.

5. Apparatus as claimed in claim 4 including an extension formed on the inner side wall of said second actuator and extending along the outer peripheral wall of said first recess, said inner fixed end portion being formed on said extension at the end thereof remote from said movable end portion.

6. Apparatus as claimed in claim 5 wherein said housing includes a main body portion having an opening therein defining the outer peripheral wall of said second recess, a cap portion mounted on said main body portion having an opening therein smaller than the opening in said main body and defining the outer peripheral wall of said first recess, and a cover member mounted in said cap portion and defining the end wall of said first recess.

7. Apparatus as claimed in claim 6 wherein the outer fixed end portion of said second actuator is clamped between said cap portion and said main body portion, and the inner fixed end portion of said second actuator and the fixed end portion of said first actuator are clamped between said cap portion and said cover member.

8. Apparatus as claimed in claim 7 including a piston member received in the openings in said main body and cap portions, said piston projecting into engagement with the movable end portion of said first actuator and having a peripheral side surface engaged with the inner side wall of said second actuator, and said piston having an enlarged outer portion overlying the movable end portion of said second actuator.

9. Apparatus as claimed in claim 8 including a port in said cover member communicating with said first chamber and a port in said cap portion communicating with said second chamber.

10. Apparatus as claimed in claim 8 wherein the side walls of said first and second actuators each comprises metal with an outer layer of elastomeric material.

11. Hydraulic brake apparatus comprising: a housing including a main body portion having an opening therein; a cap member mounted on said main body portion and having an opening therein coaxial with and smaller than the opening in said main body portion such that a shoulder is defined by said cap member at the juncture of said openings; a cover member mounted on the outer end of said cap member; a first flexible actuator received in the opening in said cap member and having a peripheral mounting flange clamped between said cap and cover members; said first actuator defining a first closed chamber with said cover member and having a movable end portion and an endless outer side wall extending between said movable end portion and said mounting flange, said side wall having at least one corrugation formed therein and being operable to change its length and hence the distance between said movable end portion and said cover member in response to pressure changes in said first chamber; a second flexible actuator received in the opening in said main body portion and having an outer peripheral mounting flange clamped between said cap member and said main body portion; said second actuator defining a second closed chamber with said shoulder and having a movable end portion, an outer side wall extending between said movable end portion and said outer mounting flange, an inner side wall extending between said movable end portion and said shoulder, an extension projecting into the opening of said cap member from said inner side wall, and an inner mounting flange on the end of said extension opposite said inner side wall; said inner mounting flange being clamped between said cap and cover members, and said inner and outer side walls of said second actuator each having at least one corrugation formed therein and being operable to change its length and hence the distance between the movable end portion and said shoulder in response to pressure changes in said second chamber.

12. Apparatus as claimed in claim 11 including complementary inclined surfaces formed on the outer end of said cap member and said cover member, said mounting flange of said first actuator and said inner mounting flange of said second actuator being clamped between said complementary inclined surfaces.

13. Apparatus as claimed in claim 11 wherein the corrugations in said side walls are inelastically deformable in response to pressure increases in said chambers causing the lengths of the actuator sidewalls to change, the inelastic deformation of said corrugations preventing the sidewalls from elastically rebounding to their original lengths when the pressure is subsequently reduced.

14. Apparatus as claimed in claim 11 including a stepped piston having a reduced portion projecting into engagement with the movable end portion of said first actuator and having a peripheral side surface engaged with the inner side wall of said second actuator, and said piston having an enlarged outer portion overlying the movable end portion of said second actuator.

15. Apparatus as claimed in claim 14 wherein the corrugations in said side walls are inelastically deformable in response to pressure increases in said chambers causing the lengths of the actuator sidewalls to change, the inelastic deformation of said corrugations preventing the sidewalls from elastically rebounding to their original lengths when the pressure is subsequently reduced.

16. Apparatus as claimed in claim 15 wherein the sidewalls of each of said actuators comprises metal and an outer layer of elastomeric material.

17. Apparatus as claimed in claim 14 wherein said main body portion comprises a disc brake caliper having a peripheral base portion and a leg portion extending therefrom, the opening in said main body portion being formed in said leg portion.

18. Apparatus as claimed in claim 17 including a rotor extending alongside said leg portion with said base portion overlying the peripheral edge of said rotor, and a brake shoe carried by said piston and movable into braking engagement with said rotor by expansion of either of said first or second chambers.

19. Apparatus as claimed in claim 18 including a source of brake fluid, an opening in said cap member connecting said source with said second chamber, and an opening in said cover member connecting said source with said first chamber.

* * * * *